United States Patent
Rizzo, Jr.

(10) Patent No.: US 9,039,887 B2
(45) Date of Patent: May 26, 2015

(54) COMPONENT FINISHING METHOD AND ASSEMBLY

(75) Inventor: John P. Rizzo, Jr., Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 339 days.

(21) Appl. No.: 13/471,406

(22) Filed: May 14, 2012

(65) Prior Publication Data

US 2013/0302648 A1 Nov. 14, 2013

(51) Int. Cl.
C25F 3/16 (2006.01)
B23K 26/00 (2014.01)

(52) U.S. Cl.
CPC ......... *B23K 26/00* (2013.01); *Y10T 428/12993* (2015.01); *Y10T 428/24355* (2015.01); *C25F 3/16* (2013.01)

(58) Field of Classification Search
CPC ................................. B23K 26/00; C25F 3/26
USPC ............... 205/640–686; 219/121.84
See application file for complete search history.

(56) References Cited

U.S. PATENT DOCUMENTS

| | | | |
|---|---|---|---|
| 3,385,947 A | 5/1968 | Inoue | |
| 4,283,259 A | 8/1981 | Melcher et al. | |
| 4,672,727 A | 6/1987 | Field | |
| 5,028,304 A | 7/1991 | Stanishevsky et al. | |
| 5,605,639 A | 2/1997 | Banks et al. | |
| 6,303,193 B1 | 10/2001 | Guida et al. | |
| 6,679,985 B2 | 1/2004 | Kim et al. | |
| 7,306,026 B2 | 12/2007 | Memmen | |
| 7,416,652 B2 | 8/2008 | Oelsch | |
| 7,673,669 B2 | 3/2010 | Snyder et al. | |
| 7,863,544 B2 * | 1/2011 | Serruys et al. | 219/121.83 |
| 7,871,503 B2 | 1/2011 | Mai et al. | |
| 2003/0024122 A1 | 2/2003 | Ichiyama et al. | |
| 2003/0098245 A1 | 5/2003 | Lin et al. | |
| 2008/0289970 A1 * | 11/2008 | Piesslinger-Schweiger et al. | 205/675 |
| 2010/0012506 A1 | 1/2010 | Prichystal | |
| 2011/0042201 A1 * | 2/2011 | Von Gutfeld et al. | 204/200 |
| 2011/0303553 A1 * | 12/2011 | Inman et al. | 205/659 |

FOREIGN PATENT DOCUMENTS

| | | |
|---|---|---|
| JP | 60-208500 | 10/1985 |
| KR | 100703125 | 4/2007 |

OTHER PUBLICATIONS

International Search Report and Written Opinion for International Application No. PCT/US2013/039595 completed on Sep. 17, 2013.
International Preliminary Report on Patentability for PCT Application No. PCT/US2013/039595, mailed Nov. 27, 2014.

* cited by examiner

*Primary Examiner* — Nicholas A Smith
(74) *Attorney, Agent, or Firm* — Carlson, Gaskey & Olds, P.C.

(57) ABSTRACT

An example component finishing method includes immersing a surface of a component within a fluid during a finishing process. The method heats fluid near the surface during the finishing to create a convection current within the fluid that carries a byproduct of the finishing away from the surface.

10 Claims, 2 Drawing Sheets

COMPONENT FINISHING METHOD AND ASSEMBLY

BACKGROUND

This disclosure relates generally to finishing a component surface and, more particularly, to finishing techniques that immerse at least a portion of the component in a fluid.

Many components include surfaces that are finished prior to use. The surfaces of both used components and newly manufacturing components may be finished. As an example, the surfaces of a high pressure compressor blade may be polished prior to use within a turbomachine. Polishing is one type of finishing. Turbomachine components often require relatively low surface finishing, such as an average surface roughness ($R_a$) of 1 to 5 micro-inch (0.0254 to 0.127 microns) $R_a$.

Electrochemical machining (or ECM) is an example finishing process that immerses at least a portion of a component in a fluid. Electrochemical machining processes use electrical energy to remove material. An ECM process creates an electrolytic cell in an electrolyte medium. A tool serves as a cathode, and the component serves as an anode. During the process, the ECM tool is positioned very close to the workpiece and a low voltage, high amperage DC current is passed between the two via an electrolyte. A high-amperage, low-voltage current is then applied to dissolve and remove metal from the component.

Electrochemical deburring is a type of electrochemical machining designed to remove burrs and impart small radii to corners. The process normally uses a specially shaped electrode to carefully control the process to a specific area. Unlike many other machining methods, workpiece hardness is not a significant factor in ECM, making ECM suitable for difficult-to-machine materials.

The electrochemical machining process can produce byproducts, such as salt, at the surface of the component being finished. The salt inhibits the finishing.

SUMMARY

A component finishing method according to an exemplary aspect of the present disclosure includes, among other things, immersing a surface of a component within a fluid during a finishing process and heating fluid near the surface during the finishing process to create a convection current within the fluid that carries a byproduct of the finishing process away from the surface.

In a further non-limiting embodiment of the foregoing method, the method may include using a heat source that is outside the fluid for the heating.

In a further non-limiting embodiment of either of the foregoing methods, the byproduct may comprise a salt boundary layer.

In a further non-limiting embodiment of any of the foregoing methods, the finishing process may comprise electrochemical polishing.

In a further non-limiting embodiment of any of the foregoing methods, the immersing may comprise immersing the entire component within the fluid.

In a further non-limiting embodiment of any of the foregoing methods, the method may include directing a laser beam at the surface during the heating to heat the fluid near the surface.

In a further non-limiting embodiment of any of the foregoing methods, the method may include directing the laser beam through a wall of a tank holding the fluid.

In a further non-limiting embodiment of any of the foregoing methods, the method may include redirecting the laser beam to create a convection current in another area of the two.

In a further non-limiting embodiment of any of the foregoing methods, the convection current may have a laminar flow.

A component finishing assembly according to another exemplary aspect of the present disclosure includes, among other things, a tank configured to hold a fluid and a component during a finishing process and a heat source outside the tank. The heat source is configured to create a convection current within a selected area of the fluid.

In a further non-limiting embodiment of the foregoing component finishing assembly, the convection current may carry a byproduct of the finishing away from the surface.

In a further non-limiting embodiment of either of the foregoing component finishing assemblies, the heat source may comprise a laser assembly.

In a further non-limiting embodiment of any of the foregoing component finishing assemblies, the laser assembly may be configured to direct a laser beam through a wall of the tank to heat the selected area of the fluid.

In a further non-limiting embodiment of any of the foregoing component finishing assemblies, the finishing process may be an electrochemical machining process.

In a further non-limiting embodiment of any of the foregoing component finishing assemblies, the system may include a thermal imaging camera configured to monitor thermal energy of at least some of the fluid.

A component assembly having a finished surface according to another exemplary aspect of the present disclosure includes, among other things, an electrochemically machined surface of a component in which byproducts have been removed from the electrochemically machined surface by a convection current.

In a further non-limiting embodiment of the foregoing component assembly, the electrochemically machined surface may have an average roughness of from 1 to 5 micro-inch (0.0254 to 0.127 microns) $R_a$.

In a further non-limiting embodiment of either of the foregoing component assemblies, the component may be a refractory metal core.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
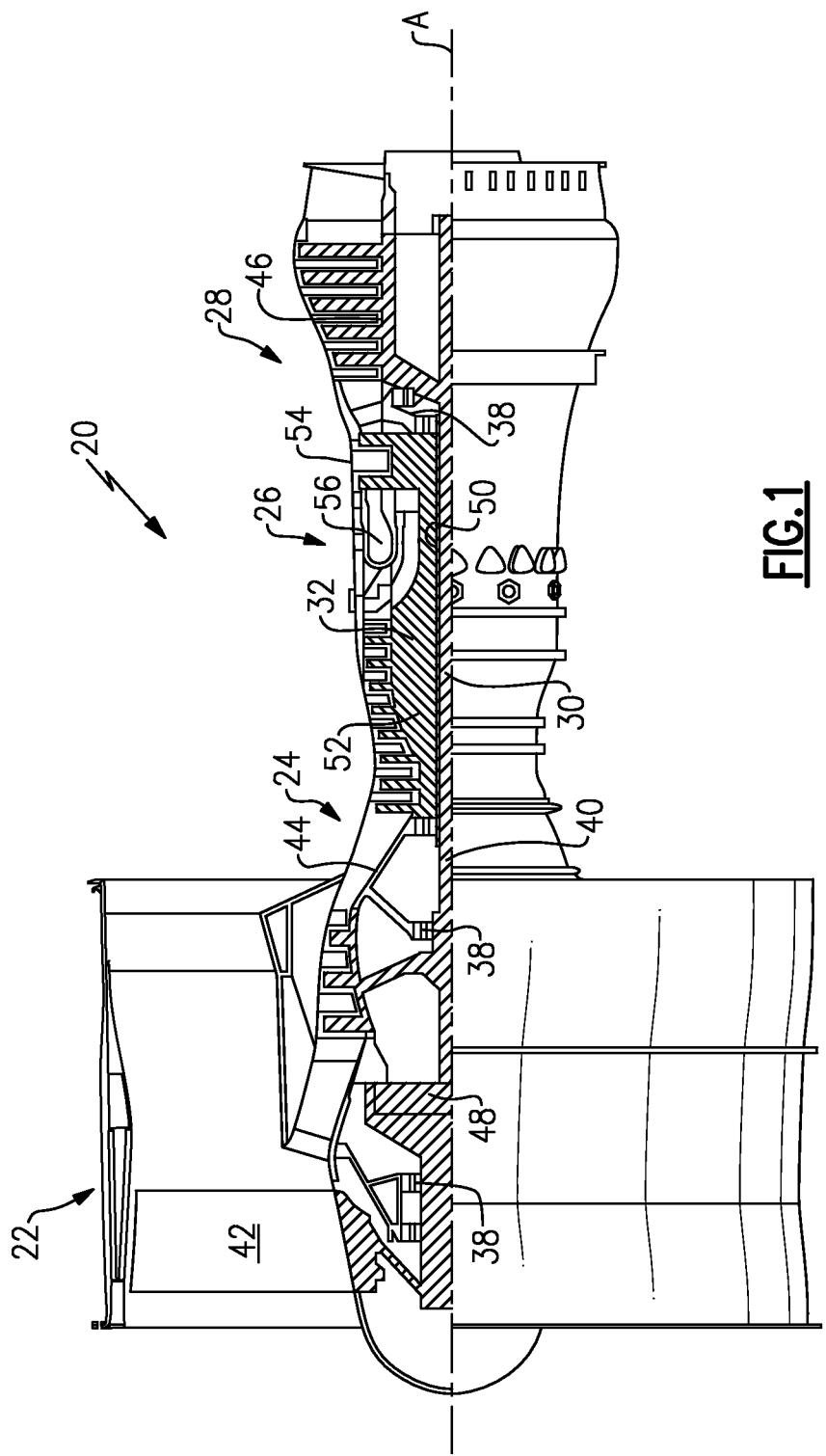
FIG. 1 shows a section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compressor section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures.

In the example engine 20, flow moves from the fan section 22 to a bypass flowpath. Flow from the bypass flowpath generates forward thrust. The compressor section 24 drives air along the core flowpath. Compressed air from the compressor section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes an inner shaft 40 that interconnects a fan 42, a low-pressure compressor 44, and a low-pressure turbine 46. The inner shaft 40 is connected to the fan 42 through a geared architecture 48 to drive the fan 42 at a lower speed than the low-speed spool 30.

The high-speed spool 32 includes an outer shaft 50 that interconnects a high-pressure compressor 52 and high-pressure turbine 54.

The inner shaft 40 and the outer shaft 50 are concentric and rotate via bearing systems 38 about the engine central longitudinal axis A, which is collinear with the longitudinal axes of the inner shaft 40 and the outer shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

Low Corrected Fan Tip Speed is the actual fan tip speed divided by an industry standard temperature correction of Temperature divided by 518.7^0.5. The Temperature represents the ambient temperature in degrees Rankine. The Low Corrected Fan Tip Speed according to one non-limiting embodiment of the example engine 20 is less than about 1150 fps (351 m/s).

The engine 10 includes many components having surfaces that are finished prior to use. Some surfaces of a component may require more finishing than other surfaces of the component. Prior art finishing processes were not able to suitably accommodate varied finishing.

Figure 2:
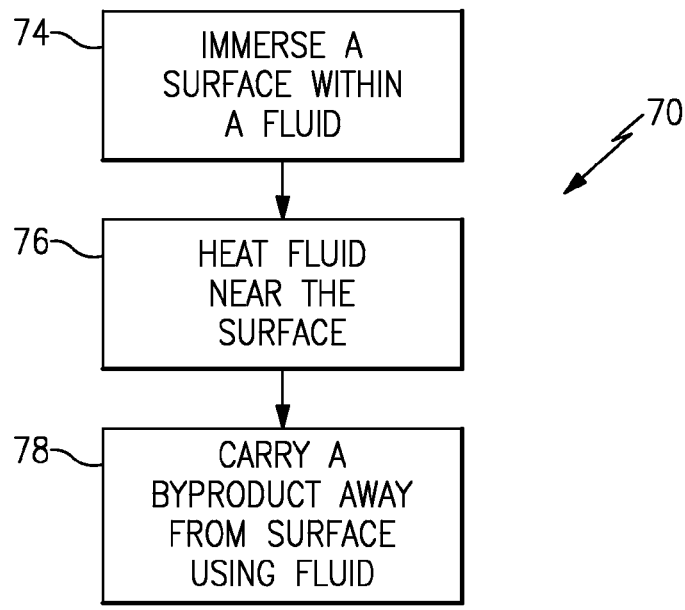
FIG. 2 schematically shows an example method of finishing a component of the FIG. 1 turbomachine.

Referring to FIG. 2, an example method of finishing a component surface 70 includes a step 74 of immersing a surface of a component within a fluid and a step 76 of heating fluid near the surface of the component. The heated fluid carries a byproduct away from the surface of the component at a step 78.

In one example of the method 70, heating fluid near the surface of the component at the step 78 establishes a convection current within the fluid. The convection current carries the byproduct away from the surface of the component at the step 82. The convection current has a predominantly laminar flow as the convection current is a result of thermal energy rather than, for example, a fluid jet mechanism that turbulates fluid to move a byproduct away from the surface.

Figure 3:
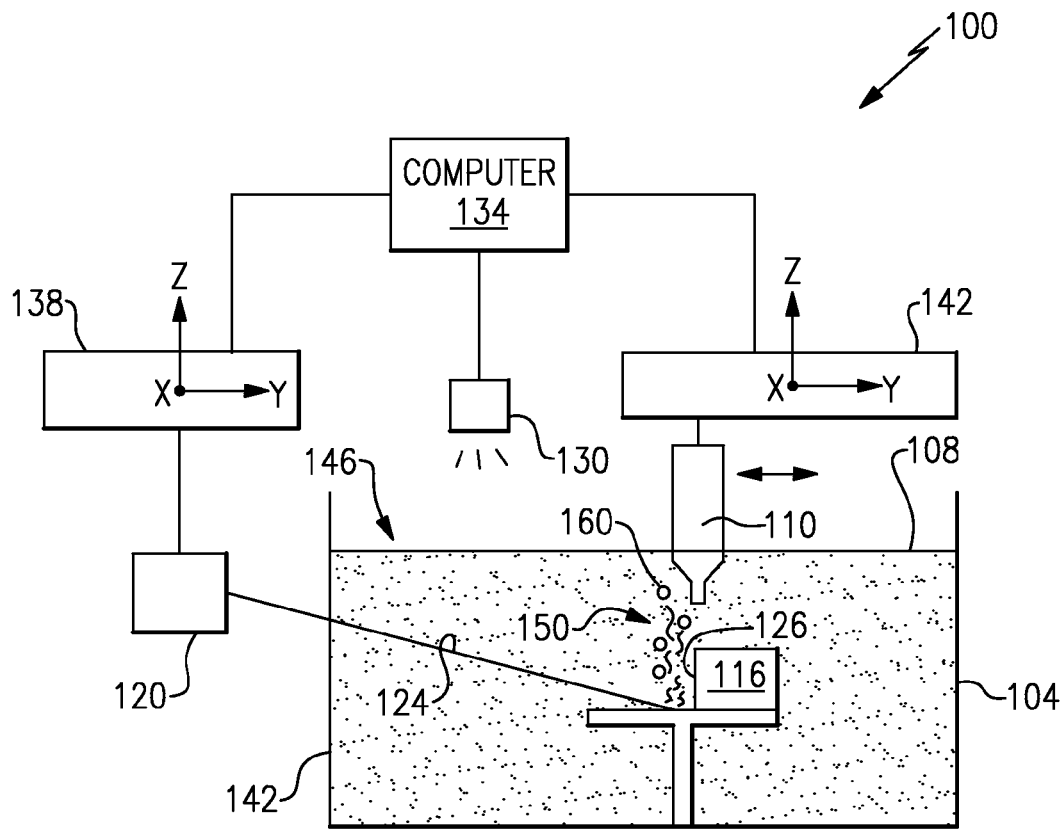
FIG. 3 schematically shows an example assembly using the method of FIG. 2.

Referring now to FIG. 3 with continuing reference to FIGS. 1 and 2, an example finishing assembly 100 is an electrochemical finishing assembly. The finishing assembly 100 includes a tank 104 holding a fluid 108. A shaped electrode 110 is at least partially disposed within the fluid 108. A component 116 (workpiece) having a surface to be finished is also disposed within the fluid 108. The polarity of the shaped electrode 110 is opposite the polarity of the component 116. Probes (not shown) may be used to help finish the surface of the components 116.

The fluid 108 includes an electrolyte. During a finishing process, a current is applied to the shaped electrode 110 and the component 116, which causes a chemical reaction within the fluid 108 by which surfaces of the component 116 are electrochemically machined. Particles of the component 116 are driven off into the fluid 108 during the machining. The shaped electrode 110 is moved relative to the component 116 to electrochemically machine different areas of the component 116.

The example finishing assembly includes a heat source that heats a surface of the component 116 as the component is electrochemically machined. In this example, the heat source is a laser assembly 120 that directs a laser beam 124 into the fluid 108. The laser assembly 120 is a type of heat source. The laser assembly 120 is not immersed within the fluid 108.

In this example, the laser assembly 120 directs the laser beam 124 into the tank 104 to create a convection current 150 near the surface 126 of the component 116. The convection current 150 causes fluid 108 to move over and away from the surface 126. The moving fluid 108 carries byproducts 160 of a finishing operation away from the surface 126, which improves the quality of the finishing operation at the surface 126. Example byproducts 160 include sodium carbonate salts generated during an electrochemical forming process.

The laser assembly 120 of the finishing assembly 100 may direct the laser beam 124 directly at the surface 126 or toward another area of the tank 104. The precise location of the laser beam 124 relative to the component 116 does not matter provided the laser beam 124 generates sufficient thermal energy to create the convection current 150 that moves across the surface 154.

The example component 116 is a blade from the high-pressure compressor 52 of the gas turbine engine 20. In another example, the component 116 is a refractory metal core that is used when casting the blade. The component 116 could be components other than a blade or refractory metal core in other examples.

A thermal imaging camera 130 may be directed toward the tank 104 to reveal information about the thermal energy of the fluid 108, the component 116, etc. The thermal imaging camera 130 sends this information to a computer 134 that is operatively linked to the laser assembly 120, the shaped electrode 110, and the electrode 112 through respective positional controllers 138 and 142.

Thermocouples could also be used to monitor thermal energy of the fluid 108, the component 116, or both. The thermocouples could be used to ensure that the process is controlled within relatively tight tolerances. Information from the thermocouples may be used to drive the laser assembly 120 to heat the fluid more or less.

The positional controller 138 adjusts the position of the laser assembly 120 based on commands from the computer 134. Adjusting the laser assembly 120 causes the laser beam 124 to be redirected to a different area of the tank 104. The thermal energy introduced by the laser beam 124 can be controlled by adjusting the laser assembly 120 to move the laser beam 124 to different areas of the tank 104.

The positional controller 138 adjusts the positions of the shaped electrode 110 based on commands from the computer 134. The computer 134 may adjust the position of the shaped electrode 110 relative to the component 116 to vary the electrochemical machining of the component 116. Distance between the component 116, and the shaped electrode 110 is a factor capable of varying the rate of electrochemical machining.

The laser beam 124, in some examples, may be used to heat fluid 108 that moves over a surface of the component 116 having burrs. The laser beam 124 may facilitate deburring these areas of the component 116 due to removing byproduct from these areas of the component 116. The laser beam 124 could also improve finishing at chamfered and radiused areas of the component 116 by moving fluid over these areas.

In this example, the heat source, which is the laser assembly 120, is outside the tank 104 and thus spaced from the fluid 108. The laser assembly 120 directs the laser beam 124 through a wall 142 of the tank. In some examples, the wall 142 is a glass wall to enable the laser beam 124 to pass through the wall 142 with relatively minimal distortion.

In other examples, the laser beam 124 is directed through an open area 146 of the tank 104 directly into the fluid 108. In such examples, bubbles at the surface of the fluid 108 may undesirably influence the path of the laser beam 124.

In this example, the component 116 after being removed from the fluid 108 has an average surface roughness of from 1 to 5 micro-inch (0.0254 to 0.127 microns) $R_a$. The surface 126, which was heated by the laser beam 124 during the electrochemical machining, has a roughness that is lower than the roughness than other portions of the component 116.

Features of the disclosed examples include an improved finishing operation for a component due to thermal energy introduced near the component within a fluid. The improvements may include decreasing a cycle time. The improvements may further include using less electrolyte fluid and other chemicals due to the more effective finishing.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A component finishing method, comprising:
    immersing a surface of a component within a fluid during a finishing process;
    heating fluid near the surface during the finishing process to create a convection current within the fluid that carries a byproduct of the finishing process away from the surface; and
    directing a laser beam at a target location within the fluid and spaced from the component during the heating.

2. The component finishing method of claim 1, including using a heat source that is outside the fluid for the heating.

3. The component finishing method of claim 1, wherein the byproduct comprises a salt boundary layer.

4. The component finishing method of claim 1, wherein the finishing process comprises electrochemical polishing.

5. The component finishing method of claim 1, directing the laser beam at a target on a platform supporting the component, the platform separate and distinct from the component, the target oriented transversely to the surface during the heating to heat the fluid near the surface.

6. The component finishing method of claim 5, including directing the laser beam through a wall of a tank holding the fluid.

7. The component finishing method of claim 5, redirecting the laser beam to create a convection current in another area of the fluid.

8. The component finishing method of claim 1, wherein the convection current has a laminar flow.

9. A component finishing method, comprising:
    immersing a surface of a component within a fluid during a finishing process;
    heating fluid near the surface during the finishing process to create a convection current within the fluid that carries a byproduct of the finishing process away from the surface; and
    directing a laser beam at a target that is spaced from all portions of the component, the laser beam heating the fluid near the surface to create the convection current.

10. A component finishing method, comprising:
    immersing a surface of a component within a fluid during a finishing process;
    heating fluid near the surface during the finishing process to create a convection current within the fluid that carries a byproduct of the finishing process away from the surface; and
    directing a laser beam at a target that is spaced from the surface, the laser beam heating the fluid near the surface to create the convection current.

* * * * *